United States Patent Office 2,838,333
Patented June 10, 1958

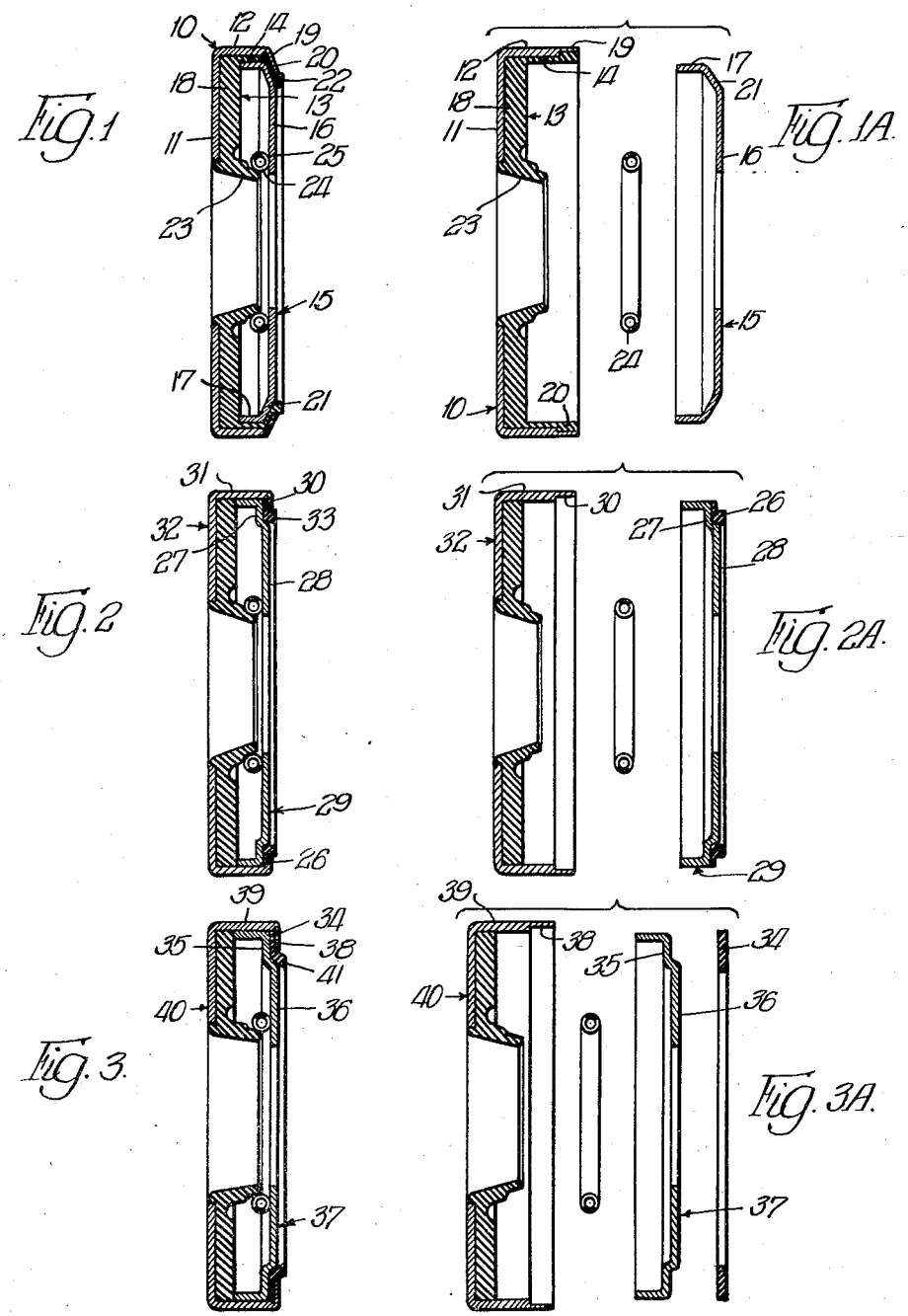

2,838,333

OIL SEAL

Phelps Wilder, Winnetka, and Casimir Czernik, Chicago, Ill., assignors to Chicago Rawhide Manufacturing Company, Chicago, Ill., a corporation of Illinois Application February 20, 1956, Serial No. 566,568

6 Claims. (Cl. 288—3)

This invention has to do with oil seals, and is particularly concerned with oil seals of the metal-encased type which are adapted for press-fit insertion in a bore in a housing about a centrally located shaft for sealing off the opening present between the bore and the shaft.

In the installation of seals of this type it is sometimes difficult, if not impossible, to obtain a fluid-tight press fit between the outer periphery of the casing of the seal and the bore of the housing, either because the casing is a little undersize or the bore a little oversize, or because of minute striations present on the casing or in the bore. With the improvement which constitutes the subject matter of this invention this difficulty can in many instances be eliminated.

The purpose of the invention is to provide, in association with a seal of this type, novel means for gasketing the casing of the seal, either against the end of the bore in the housing or against the end of a bearing race or other member mounted in the bore.

While the foregoing statements are indicative in a general way of the nature of the invention other more specific objects and advantages will be evident to those skilled in the art upon a full understanding of the construction, arrangement, cooperation and purpose of the several parts which constitute the improved seal.

Three different embodiments of the invention are presented herein by way of exemplification, but it will of course be appreciated that the invention is susceptible of incorporation in other structurally modified forms coming equally within the scope of the appended claims.

In the accompanying drawing:

Fig. 1 is a diametric section through a seal which embodies the invention;

Fig. 1A shows in diametric section the parts which are combined to provide the seal shown in Fig. 1;

Fig. 2 is a diametric section through another seal which embodies the invention;

Fig. 2A shows in diametric section the parts which are combined to provide the seal shown in Fig. 2;

Fig. 3 is a diametric section through still another seal which embodies the invention; and Fig. 3A shows in diametric section the parts which are combined to provide the seal shown in Fig. 3.

The embodiment of the invention shown in Figs. 1 and 1A will first be described. The seal shown in those views includes a centrally apertured outer sheet metal cup 10 which is characterized by a bottom 11 and a rim 12. An annular sealing member 13 of rubber-like material is positioned in the cup 10 and is bonded against the bottom 11 of the cup. This sealing member 13 is provided adjacent its outer periphery with an axial sleeve-like extension 14 which is bonded against and is substantially coextensive with the rim 12 of the cup. A centrally apertured inner sheet metal cup 15 is inversely nested within the outer cup 10, with its bottom 16 substantially flush with the edge of the rim 12 of the outer cup and with its rim 17 in axial abutment with the portion 18 of the sealing member which is bonded against the bottom 11 of the outer cup. The rim 12 of the outer cup is provided with a narrow inturned edge 19, which is preferably of less thickness than the rim, and the portion 20 of the extension 14 which is located closely adjacent the edge of such extension is clamped or squeezed tightly between the outer portion 21 of the bottom 16 of the inner cup and the inturned edge 19, with such pressure as to cause the edge of said extension, which is deformable but substantially non-compressible, to project axially as an extrusion beyond the inturned edge 19, whereby to provide an annular bead-like gasket 22.

With this construction, when the seal is forcibly press-fitted into the bore as far as it will go, the resiliently deformable gasket 22 will abut with and effectively seal against the end of the bore, or, if a bearing race or other member already has been positioned in the bore, against such other member.

As is customary in seals of this general type, the sealing member 13 is provided adjacent its inner periphery with a lip 23 of suitable shape for sealing coaction with the shaft, and this lip may be constricted about the shaft by a tensioned garter spring 24 on the lip, which spring may be held in position on the lip by engagement of the spring with the inner portion 25 of the bottom 16 of the inner cup.

In the embodiment shown in Figs. 2 and 2A the same endwise gasketing effect is obtained by bonding an annular gasketing member 26 to the outer portion 27 of the bottom 28 of the inner cup 29. When the seal is assembled or closed this gasketing member will be clamped by the edge 30 of the rim 31 of the outer cup 32, as in the first described embodiment. The gasketing member 26, if desired, may be provided in the exposed portion thereof with a pre-formed bead-like enlargement 33, or else sufficient clamping pressure may be exerted on the gasketing member 26 to produce a comparable enlargement.

In the embodiment shown in Figs. 3 and 3A the gasketing member is a separately assembled thin flat disk 34, and the outer portion 35 of the bottom 36 of the inner cup 37 and the edge 38 of the rim 39 of the outer cup 40 are clamped together on the disk 34 to cause the exposed portion 41 of the disk to protrude to provide the desired gasket.

While the improvement which constitutes the subject matter of this invention has been illustrated and described in connection with radial type seals, i. e. seals which are provided at their inner peripheries with lips which are adapted to bear radially against the shaft, it will be obvious that the invention is also applicable to seal of other types, such as end face seals, in which the sealing element, instead of engaging radially with the shaft, bears end-wise under resilient pressure against a mating ring or other member associated with the shaft.

We claim:

1. A seal for insertion in a bore in a housing about a centrally located shaft for sealing off the opening between the housing and the shaft, said seal being characterized by a centrally apertured cup having a bottom and a rim, an annular sealing member mounted in the cup, a centrally apertured closure washer which is positioned in the cup substantially flush with the edge of the rim of the latter, a narrow inturned edge on the rim of the cup for retaining the washer in position, an annular gasketing member of rubber-like material which is clamped between the outer portion of the washer and said inturned edge, with an exposed portion of said gasket protruding axially beyond said inturned edge to provide an annular gasket.

2. A seal for insertion in a bore in a housing about a centrally located shaft for sealing off the opening between the housing and the shaft, said seal being characterized by a centrally apertured outer cup having a bottom and a rim, an annular sealing member of rubber-like material positioned in the cup against the bottom of the latter, which sealing member is provided adjacent its outer periphery with an axial extension which is positioned against and is substantially coextensive with the rim of the cup, a centrally apertured inner cup which is inversely nested within the outer cup with its bottom substantially flush with the edge of the rim of the outer cup and with the edge of its rim in abutment with the portion of the sealing member positioned against the bottom of the outer cup, and a narrow inturned edge on the rim of the outer cup between which and the bottom of the inner cup the said extension is clamped, with the edge of said extension projecting axially beyond said inturned edge in the form of an annular gasket.

3. A metal-encased seal for press-fit insertion in a bore in a housing about a centrally located shaft for sealing off the opening between the housing and the shaft, said seal being characterized by a centrally apertured outer metal cup having a bottom and a rim, an annular sealing member of rubber-like material bonded in the cup against the bottom of the latter, which sealing member is provided adjacent its outer periphery with an axial extension which is bonded against and is substantially coextensive with the rim of the cup, a centrally apertured inner metal cup which is inversely nested within the outer cup with its bottom substantially flush with the edge of the rim of the outer cup and with the edge of its rim in axial abutment with the portion of the sealing member which is bonded against the bottom of the outer cup, and a narrow inturned edge on the rim of the outer cup between which and the bottom of the inner cup the said extension is clamped under such pressure as to cause the edge of said extension to project axially beyond said inturned edge in the form of an annular gasket.

4. A seal for insertion in a bore in a housing about a centrally located shaft for sealing off the opening between the housing and the shaft, said sealing being characterized by a centrally apertured outer cup having a bottom and a rim, an annular sealing member positioned in the cup against the bottom of the latter, a centrally apertured inner cup which is inversely nested within the outer cup with its bottom substantially flush with the edge of the rim of the outer cup and with the edge of its rim in abutment with said sealing member, a narrow inturned edge on the rim of the outer cup which edge is directed inwardly toward the bottom of the inner cup, and a deformable gasket portion clamped between the inturned edge and the bottom of the inner cup with the inner edge of said gasket portion projecting axially beyond the inturned edge and the bottom of the inner cup in the form of an annular bead-like enlargement.

5. A seal for insertion in a bore in a housing about a centrally located shaft for sealing off the opening between the housing and the shaft, said seal being characterized by a centrally apertured outer cup having a bottom and a rim, an annular sealing member positioned in the cup against the bottom of the latter, a centrally apertured inner cup which is inversely nested within the outer cup with its bottom substantially flush with the edge of the rim of the outer cup and with the edge of its rim in abutment with said sealing member, said sealing member being provided with a radially inwardly acting flexible lip defining the inner periphery thereof, an annular spring in engagement with the outer peripheral surface of said lip and held thereon by the bottom of said inner cup, a narrow inturned edge on the rim of the outer cup which edge is directed inwardly toward the bottom of the inner cup, and a deformable gasket portion clamped between the inturned edge and the bottom of the inner cup with the inner edge of said gasket portion projecting axially beyond the inturned edge and the bottom of the inner cup in the form of an annular bead-like enlargement.

6. A seal for insertion in a bore in a housing about a centrally located shaft for sealing off the opening between the housing and the shaft, said seal being characterized by a centrally apertured outer cup having a bottom and a rim, an annular sealing member positioned in the cup against the bottom of the latter, a centrally apertured inner cup which is inversely nested within the outer cup with its bottom substantially flush with the edge of the rim of the outer cup and with the edge of its rim in abutment with said sealing member, a narrow inturned edge on the rim of the outer cup which edge is directed inwardly toward the inner cup, and a deformable gasketing member clamped between the inturned edge and the bottom of the inner cup with the inner edge of said gasketing member projecting axially beyond the inturned edge and the bottom of the inner cup in the form of an annular bead-like enlargement, the outer marginal portion of the bottom of said inner cup being axially recessed to define an annular groove in which said gasketing member is clamped.

References Cited in the file of this patent
UNITED STATES PATENTS

| | | |
|---|---|---|
| 2,071,198 | Chambers | Feb. 16, 1937 |
| 2,451,269 | Allen et al. | Oct. 12, 1948 |